(12) United States Patent
Lapôtre et al.

(10) Patent No.: US 12,407,231 B2
(45) Date of Patent: Sep. 2, 2025

(54) ROTATING ELECTRIC MACHINE, FORCE FEEDBACK MINI-JOYSTICK AND RELATED AIRCRAFT

(71) Applicant: SAFRAN ELECTRONICS & DEFENSE, Paris (FR)

(72) Inventors: Blaise Lapôtre, Moissy-Cramayel (FR); Julien Argenton, Moissy-Cramayel (FR); Yannick Attrazic, Moissy-Cramayel (FR); Xavier Marcel Adolphe Ferraud, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 274 days.

(21) Appl. No.: 17/938,760

(22) Filed: Oct. 7, 2022

(65) Prior Publication Data

US 2023/0116617 A1    Apr. 13, 2023

(30) Foreign Application Priority Data

Oct. 7, 2021   (FR) ...................................... 2110628

(51) Int. Cl.
| | |
|---|---|
| *H02K 24/00* | (2006.01) |
| *B64C 13/50* | (2006.01) |
| *H02K 1/12* | (2006.01) |
| *H02K 1/27* | (2022.01) |
| *H02K 11/215* | (2016.01) |

(52) U.S. Cl.
CPC ........... *H02K 24/00* (2013.01); *B64C 13/507* (2018.01); *H02K 1/12* (2013.01); *H02K 1/27* (2013.01); *H02K 11/215* (2016.01)

(58) Field of Classification Search
CPC ........... H02K 24/00; H02K 1/12; H02K 1/27; H02K 11/215
See application file for complete search history.

(56) References Cited

U.S. PATENT DOCUMENTS

| | | | |
|---|---|---|---|
| 6,020,737 A | | 2/2000 | Wyss |
| 2004/0027332 A1 | | 2/2004 | Cope et al. |
| 2004/0239199 A1 | | 12/2004 | Qu et al. |
| 2018/0304992 A1 | * | 10/2018 | Gomolko ............ B64C 13/0421 |

(Continued)

FOREIGN PATENT DOCUMENTS

| | | | | |
|---|---|---|---|---|
| CN | 207098872 U | | 3/2018 | |
| CN | 212649311 U | | 3/2021 | |
| DE | 112018006725 T5 | * | 9/2020 | ............... H02K 1/27 |

(Continued)

OTHER PUBLICATIONS

JP-2013162730-A_translate (Year: 2013).*

(Continued)

*Primary Examiner* — Tulsidas C Patel
*Assistant Examiner* — Mohammed Ahmed Qureshi
(74) *Attorney, Agent, or Firm* — CHRISTENSEN O'CONNOR JOHNSON KINDNESS PLLC

(57) ABSTRACT

A rotating electric machine includes a rotor and a wound stator. The wound stator has a stator shaft, wherein the stator coils are inserted in the rotor, and the stator shaft is inserted in the center of the rotor. At least one angular position sensor of the rotor is inserted in the center of the space delimited by the stator shaft and the rotor.

10 Claims, 7 Drawing Sheets

(56) References Cited

U.S. PATENT DOCUMENTS

2019/0019613 A1* 1/2019 Navarro Pérez ........ H01F 27/29

FOREIGN PATENT DOCUMENTS

| EP | 2 566 019 B1 | 3/2017 |
| EP | 3 703 225 A1 | 9/2020 |
| FR | 2 903 660 B1 | 6/2009 |
| JP | 2013162730 A * | 8/2013 |
| KR | 10-2253691 B1 | 5/2021 |

OTHER PUBLICATIONS

DE-112018006725-T5_translate (Year: 2020).*
France Search Report and Written Opinion mailed Jun. 21, 2022, issued in Application No. FR2110628, filed Oct. 7, 2021, 7 pages.

* cited by examiner

ROTATING ELECTRIC MACHINE, FORCE FEEDBACK MINI-JOYSTICK AND RELATED AIRCRAFT

CROSS-REFERENCE TO RELATED APPLICATION

This application claims priority to FR 2110628, filed Oct. 7, 2021, the disclosure of which is hereby expressly incorporated by reference herein in its entirety.

TECHNICAL FIELD

The disclosure relates to rotating electric machines, more particularly to rotating electric machines installed in force feedback mini joysticks and to aircraft equipped with such mini joysticks.

BACKGROUND

Typically, a force feedback mini joystick comprises an electric motor with sensors for the angular position of a rotor of the motor to generate a force path, so that the pilot feels the force feedback through the mini-joystick.

Since this functionality requires a high level of safety, the force path must be doubled to achieve force feedback redundancy.

Achieving force feedback redundancy requires using at least double the position sensors of the electric motor rotor.

The position sensors typically include resolvers.

FIG. 1 shows a longitudinal section of an electric motor 1 comprising a stator 2, a rotor 3 inserted into the stator 2 and four resolvers 4 forming two redundant position sensors of a rotor shaft 5 of the rotor 3.

Each resolver 4 comprises a set of coils 6 including a field coil, a sine coil and a cosine coil arranged on the rotor shaft 5, and an elliptical magnetic flux guide 7 arranged on the stator 2, separated from the set of coils 6 by an air-gap.

The resolvers 4 are stacked on top of each other. This stacking arrangement increases the length of the stator 2 and the rotor shaft 5, so that the electric motor 1 takes up a large amount of space, thus creating the need to provide a large space in a confined area such as an aircraft cockpit.

Furthermore, as the motor 1 is bulky, when fitted in the aircraft cockpit, the risk of collision of the motor 1 with other components present in the cockpit is higher.

Additionally, since the resolvers 4 are stacked on top of each other, the length of the rotor shaft 5 is so great that the inertial mass of the rotor decreases the dynamics of the motor 1 and increases the bending moment and the torsional moment of the rotor shaft 5.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In view of the above, the disclosure relates to a rotating electric machine comprising a rotor and a wound stator including a stator shaft, the stator coils being inserted in the rotor and the stator shaft being inserted in the center of the rotor.

At least one angular position sensor of the rotor is inserted in the center of the space delimited by the stator shaft and the rotor.

The insertion of the angular position sensors in the center of the space delimited by the stator coils serves to reduce the size of the rotating electric machine in order to facilitate the integration and mounting of the machine in the aircraft cockpit while reducing risks of collision with other components of the cockpit.

Additionally, as the angular position sensors are housed in the active part of the rotating electric machine, the angular position sensors are protected from shocks and magnetic disturbances by the rotor of the rotating electric machine.

Furthermore, reducing the length of the rotor serves to improve the dynamics of the rotor by reducing its inertial mass, reducing the bending moment and the torsional moment of the rotor.

Preferably, the stator comprises a toroid including the stator coils wound around the toroid.

Winding the stator coils around the toroid reduces stator magnetic flux losses, thereby increasing the electromotive force.

Advantageously, the toroid comprises two half-toroids, the coils of each half-toroid being powered by a different power system.

Should one of the power systems fail, the rotating electric machine powered by the other power system continues to operate.

Preferably, the angular position sensor comprises a variable reluctance resolver comprising sets of control coils each including a field coil, a sine coil and a cosine coil arranged on the stator shaft and an elliptical magnetic flux guide arranged on the rotor, the control coils and the magnetic flux guide being separated by an air-gap.

Advantageously, the angular position sensor comprises an elliptical permanent magnet arranged on the rotor, and means for measuring the variation of a magnetic field in two perpendicular directions arranged on the stator shaft, the magnet and the measuring means being separated by an air-gap.

Preferably, the measuring means include at least one Hall effect sensor.

Advantageously, the rotating electric machine includes at least two redundant stacked angular position sensors.

Preferably, a first angular position sensor includes a variable reluctance resolver as defined above, and the second angular position sensor includes an angular position sensor as earlier described.

The asymmetric sensor technology enhances the control reliability of the rotating electric machine.

Also proposed is a force feedback mini-joystick for aircraft, comprising a rotating electric machine as earlier described.

Also proposed is an aircraft, a force feedback mini joystick as earlier described.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Figure 1:
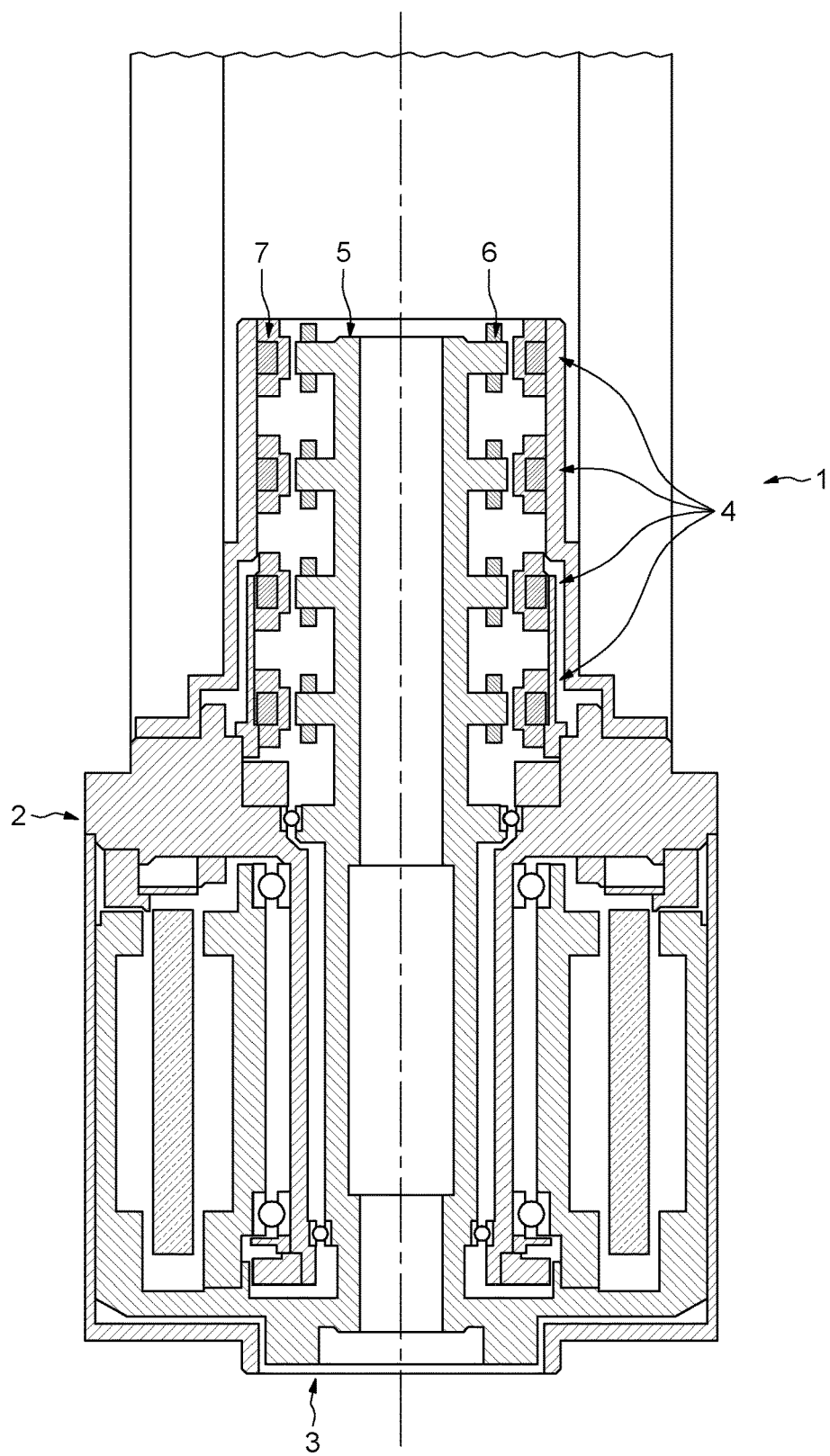
FIG. 1 already mentioned above, illustrates a longitudinal section of an electric motor according to the prior art.
Figure 2:
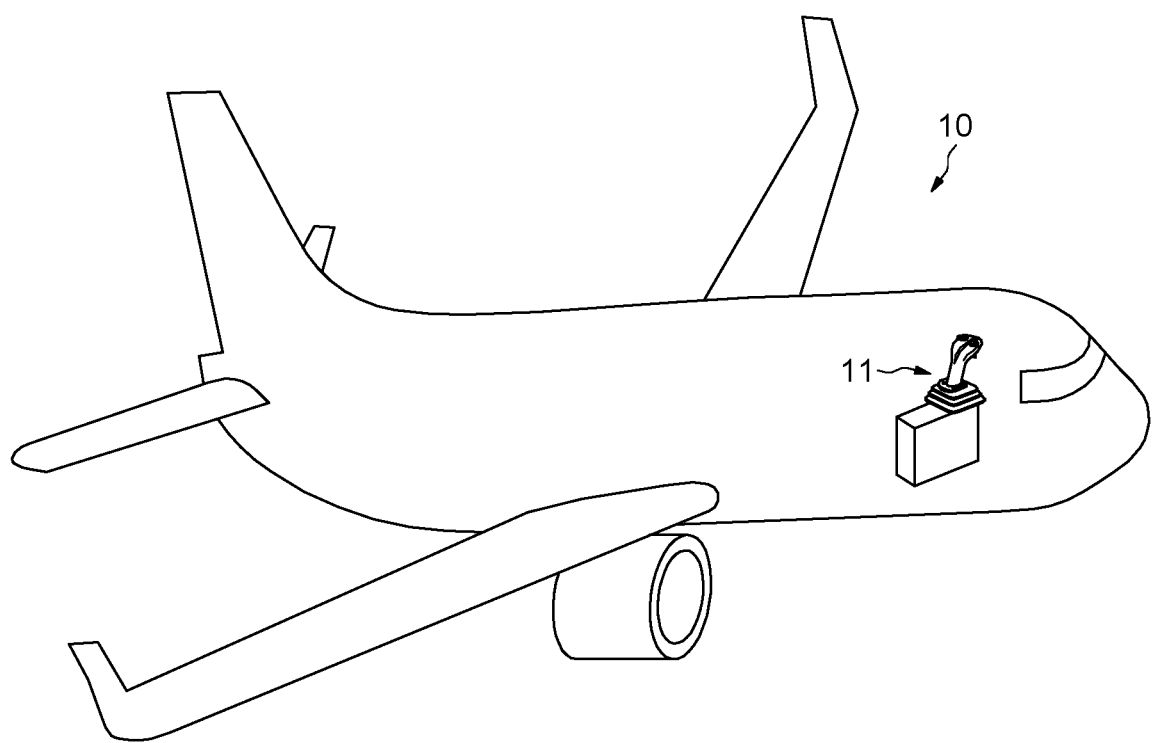
FIG. 2 schematically illustrates an aircraft according to the disclosure.

Reference is made to FIG. 2 which schematically illustrates an aircraft 10 including a cockpit comprising a force feedback mini joystick 11.

The aircraft 10 may comprise an airplane or a helicopter.

The mini-joystick includes a rotating electric machine 12 that generates a force path, so that the pilot feels the force feedback through the mini-joystick 11.

The rotating electric machine 12 may comprise several phases.

Figure 3:
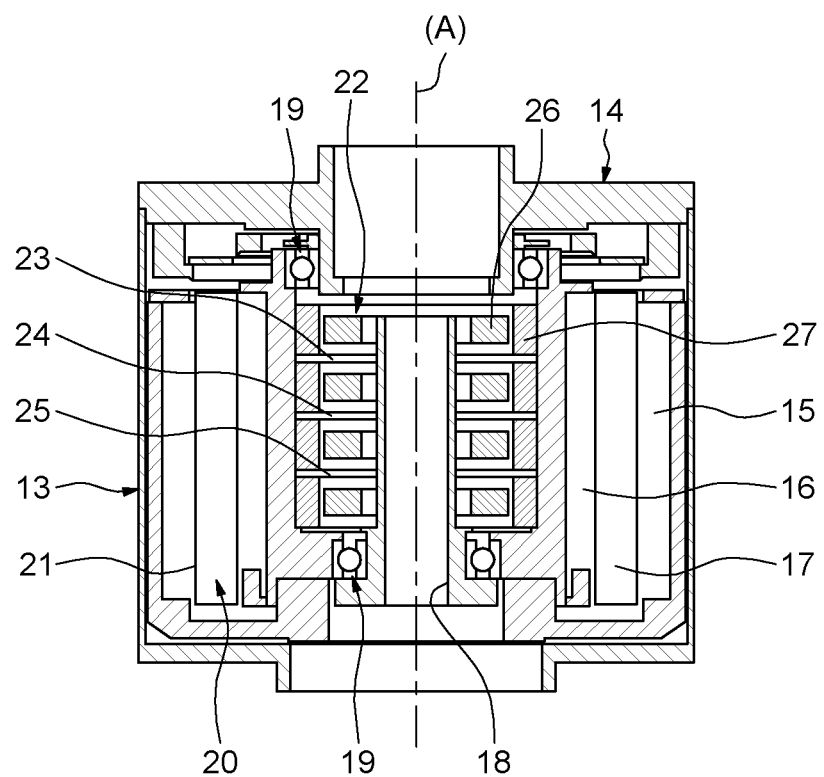
FIGS. 3 and 4 illustrate longitudinal sections of an example of a rotating electric machine according to the disclosure.
Figure 4:
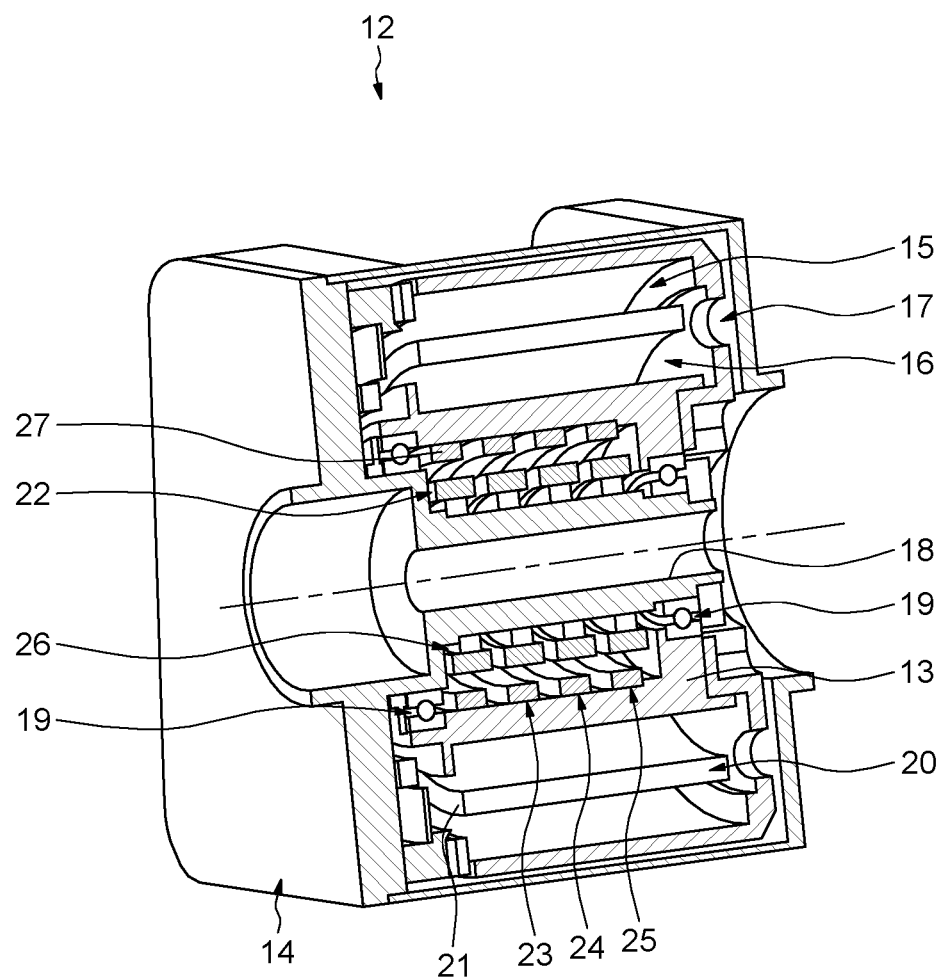

FIGS. 3 and 4 illustrate longitudinal sections of an example of rotating electric machine 12.

The rotating electric machine 12 comprises a rotation axis (A), a rotor 13 rotating around the axis (A) and a stator 14.

The rotor 13 comprises two rows of permanent magnets 15, 16 located on two parallel inner surfaces of the rotor 13, so as to form a cylindrical cavity 17 delimited by the two rows of permanent magnets 15, 16.

The rotor 13 is recessed at its center.

The stator 14 comprises a stator shaft 18 inserted into the recessed center of the rotor 13.

The rotor 13 is rotatably held in the stator 14 using ball bearings 19, for example, mounted on the stator shaft 18 and the rotor 13.

A first ball bearing 19 is arranged at a first end of the cylindrical cavity 17, and a second ball bearing 19 is arranged at a second end of the cylindrical cavity 17.

The stator 14 further comprises a toroid 20 including stator coils 21 wound around the toroid 20, and typically made of copper.

The toroid 20 is inserted into the cylindrical cavity 17 of the rotor 13, so that when the stator coils are energized, the rotor 13 is rotated about the axis of rotation (A).

As the stator coils 21 are wound around the toroid 20, the entire surface of the toroid 20 generates a magnetic flux contributing to the generation of a mechanical torque by the machine 12.

The stator magnetic flux losses are reduced, thereby increasing the electromotive force. By so doing, the power and torque developed by the machine 12 are increased so that the power density of the machine 12 is optimal.

Additionally, the generated torque does not display torque ripple or detent torque.

Alternatively, the stator coils 21 are wound on teeth of the toroid 20 arranged opposite one of the two rows of permanent magnets 15, 16.

The rotating electric machine 12 also comprises sensors for the angular position of the rotor 13 including four resolvers 22, 23, 24, 25 with variable reluctance, stacked on each other and inserted in the space delimited by the stator shaft 18 and the rotor 13.

According to an embodiment, the resolvers 22, 23, 24, 25 are stacked and inserted in the space delimited by the stator coils 21 and between the stator shaft 18 and the rotor 13.

Preferably, the angular position sensors are inserted in the centre of the space delimited by the stator coils 21.

Inserting the angular position sensors in the center of the space delimited by the stator coils 21 helps to reduce the overall dimensions of the rotating electric machine 12, making it possible to shorten the length of the rotor 13 along the axis of rotation (A), and the overall dimensions of the rotating electric machine 12.

Reducing the overall dimensions of the rotating electric machine 12 makes it easier to incorporate and mount the machine in the aircraft cockpit 10 by reducing risks of collision with other components of the cockpit.

Additionally, as the angular position sensors are housed in the active part of the rotating electric machine 12, in the space delimited by the stator coils, the angular position sensors are protected from shocks and magnetic disturbances by the rotor of the rotating electric machine 12.

Reducing the length of the rotor 13 serves to improve the dynamics of the rotor 13 by reducing its inertial mass, reducing the bending moment and the torsional moment of the rotor 13.

Since the angular position sensors are arranged between the two ball bearings 19 used to rotatably hold the rotor 13 in rotation relative to the stator 14, the stiffness of the stator shaft 18 and the rotor 13 is increased, thereby allowing more accurate angular position measurements.

It is assumed that the four resolvers 22, 23, 24, 25 are identical.

Only the first resolver 22 is detailed.

Figure 5:
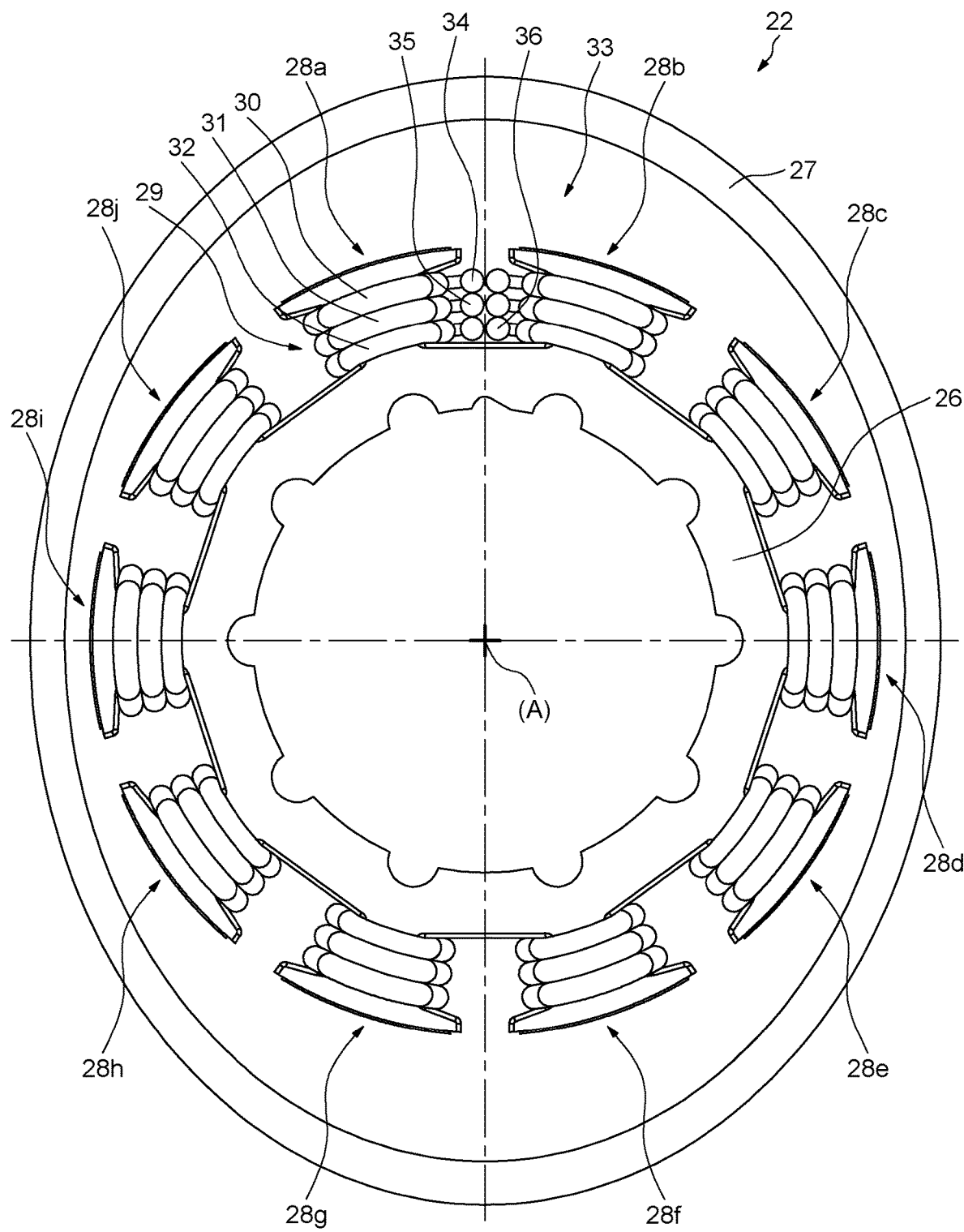
FIG. 5 illustrates a first embodiment of an angular sensor according to the disclosure.

FIG. 5 illustrates a view of the first resolver 22. The first resolver 22 comprises a yoke 26 arranged on the stator shaft 18 and an elliptical magnetic flux guide 27 arranged on the rotor 13 and surrounding the yoke 26.

The yoke 26 comprises ten coil heads 28a to 28j evenly distributed over the yoke 26.

Of course, the yoke 26 may comprise a different number of coil heads evenly distributed over the frame 26.

A set of control coils 29 including a field coil 30, a sine coil 31 and a cosine coil 32 are wound on each coil head 28a to 28j.

The field coil 30, the sine coil 31 and the cosine coil 32 of a set of control coils 29 are separated by an insulator (not shown) preventing a short circuit between the coils.

The sets of control coils 29 and the magnetic flux guide 27 are separated by an air-gap 33.

Connection terminals 34, 35, 36 are connected to the field coils 30, the sine coils 31 and the cosine coils 32.

When the field coil is excited by a sinusoidal signal, signals are generated in the sine and cosine coils.

The characteristics of the signals depend on the position of the magnetic flux guide 27 connected to the rotor 13. Analyzing the generated signals helps to determine the angular position of the rotor 13 relative to the stator 14 and to control the position of the rotor 13, in order to generate force feedback in the mini-joystick 11.

The resolvers 22, 23, 24, 25 are redundantly connected to each other in order to improve control reliability of the rotating electric machine 12 and to facilitate diagnosis should any of the resolvers fail.

For example, a first and a second resolver 22, 23 are redundantly connected to a first control channel, and a third and a fourth resolver 24, 25 are redundantly connected to a second control channel so that if the resolvers of the same control channel do not output identical signals, the control channel is considered to have failed.

The failed control channel is deactivated and control signals from the other control channel are taken into consideration.

Of course, when the rotating electric machine 12 is implemented for applications not requiring such a high reliability level, the machine 12 may comprise a single angular position sensor.

Figure 6:
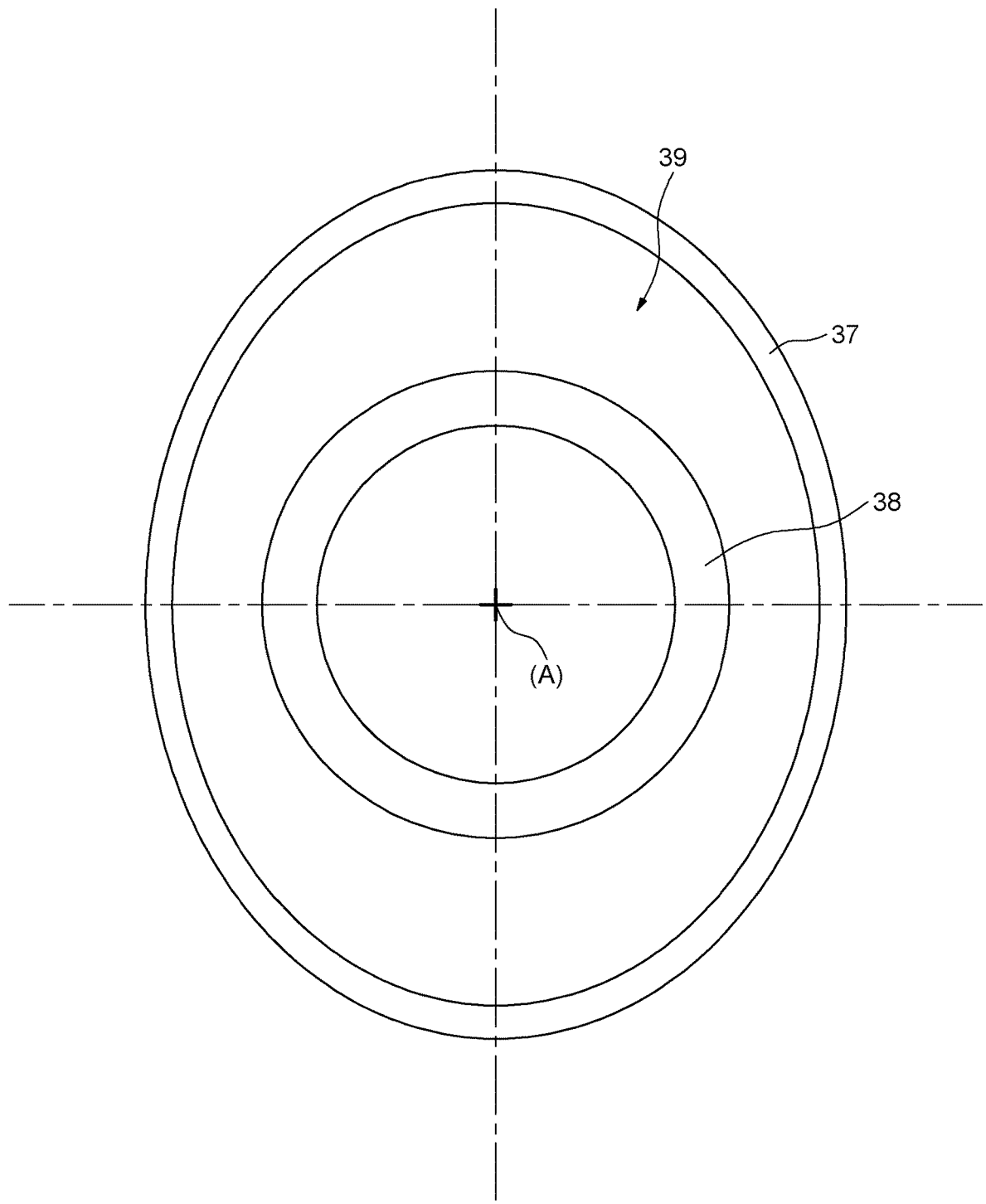
FIG. 6 illustrates a second embodiment of an angular sensor according to the disclosure.

According to a second embodiment, the angular position sensor comprises an elliptical permanent magnet 37 arranged on the rotor 13 and means 38 for measuring the variation of a magnetic field along two perpendicular directions arranged on the stator shaft 18 (FIG. 6).

The elliptical permanent magnet and the measuring means are separated by an air-gap 39.

For example, the measuring means may include at least one Hall effect sensor.

In order to further enhance the control reliability of the rotating electric machine 12, the angular position sensors comprise resolvers and Hall effect sensors associated with the permanent magnets to obtain an asymmetric sensor technology.

For example, the first and third resolvers 22, 24 are replaced by Hall effect sensors coupled to the permanent magnets.

Figure 7:
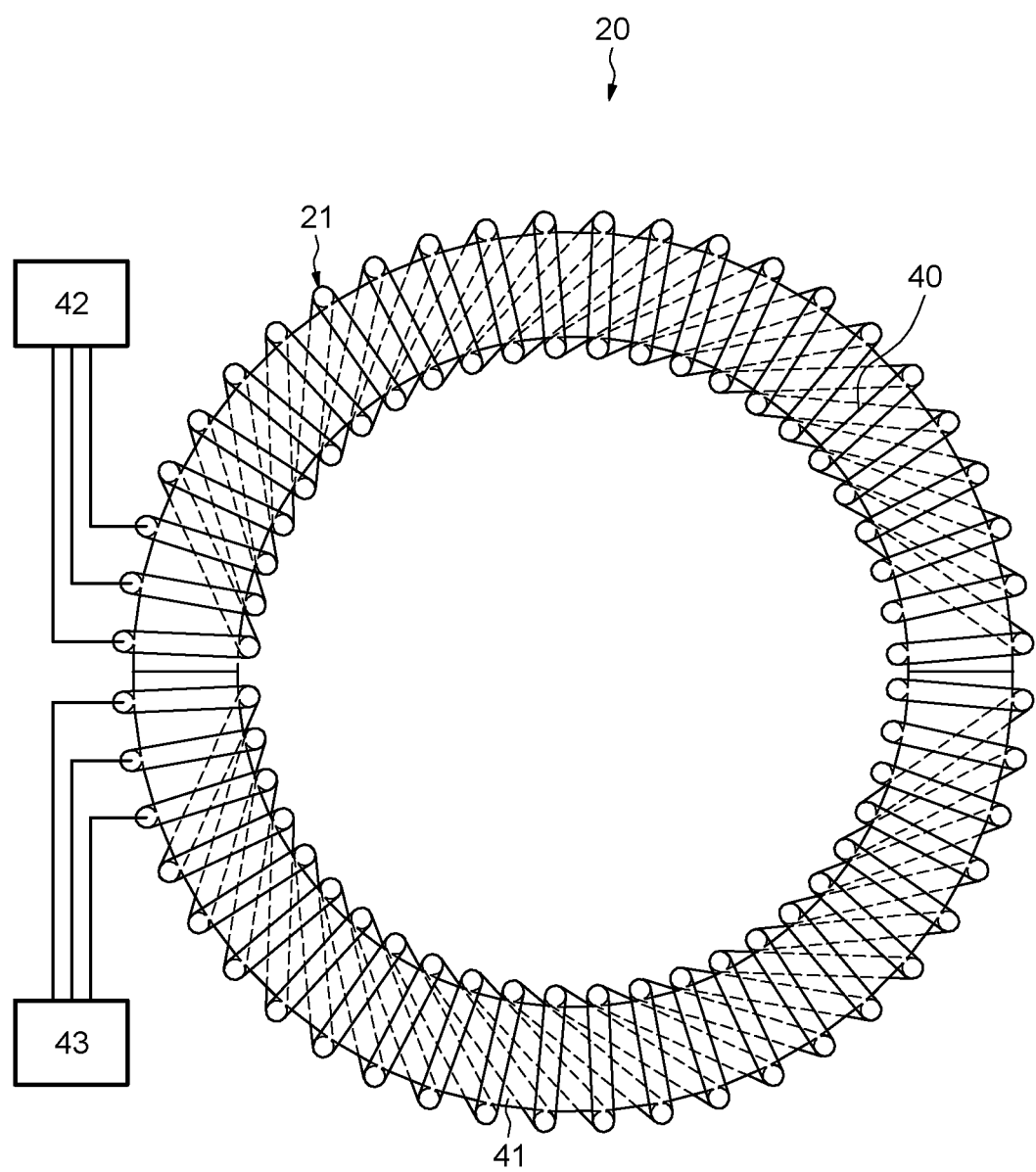
FIG. 7 illustrates an example of a toroid according to the disclosure.

FIG. 7 illustrates an example of a toroid 20 comprising the stator coils 21.

The toroid 20 is composed of two half-toroids 40, 41 on which the stator coils 21 are wound.

In order to further increase the control reliability of the rotating electric machine 12, the stator coils 21 of each half-toroid 40, 41 are powered by a different power system 42, 43, for example the three-phase type.

Should any of the power systems 42, 43 fail, the three-phase type rotating electric machine 12 continues to operate, powered by only the other power system.

Of course, the rotating electric machine 12 is of the polyphase type and may comprise more than three phases.

The embodiments of the invention in which an exclusive property or privilege is claimed are defined as follows:

1. A rotating electric machine comprising:
   a rotor; and
   a wound stator including a stator shaft and stator coils, the stator coils being inserted in the rotor and the stator shaft being inserted in a center of the rotor,
   wherein at least one angular position sensor of the rotor is inserted in a center of a space delimited by the stator shaft and the rotor, and in a center of a space delimited by the stator coils.

2. The electric machine according to claim 1, wherein the stator further includes a toroid, wherein stator coils are wound around the toroid.

3. The electric machine according to claim 2, wherein the toroid comprises two half-toroids, coils of each half-toroid being powered by a different power system.

4. The machine according to claim 1, wherein the angular position sensor comprises a variable reluctance resolver comprising sets of control coils each including a field coil, a sine coil and a cosine coil arranged on the stator shaft and an elliptical magnetic flux guide arranged on the rotor, the control coils and the magnetic flux guide being separated by an air-gap.

5. The machine according to claim 1, wherein the angular position sensor comprises an elliptical permanent magnet arranged on the rotor, and means for measuring a variation of a magnetic field in two perpendicular directions arranged on the stator shaft, the magnet and the measuring means being separated by an air-gap.

6. The machine according to claim 5, wherein the measuring means include at least one Hall effect sensor.

7. The machine according to claim 1, further comprising at least two redundant stacked angular position sensors.

8. The machine according to claim 7, wherein a first angular position sensor includes a variable reluctance resolver comprising sets of control coils each including a field coil, a sine coil and a cosine coil arranged on the stator shaft and an elliptical magnetic flux guide arranged on the rotor, the control coils and the magnetic flux guide being separated by an air-gap, and the second angular position sensor comprises an elliptical permanent magnet arranged on the rotor, and means for measuring a variation of a magnetic field in two perpendicular directions arranged on the stator shaft, the magnet and the measuring means being separated by an air-gap.

9. A force feedback mini-joystick for aircraft comprising a rotating electric machine according to claim 1.

10. An aircraft including a force feedback mini-joystick according to claim 9.

* * * * *